(12) United States Patent
Zhang et al.

(10) Patent No.: US 9,656,279 B2
(45) Date of Patent: May 23, 2017

(54) TOP SPRAYING SHOWER HEAD WITH RESET FUNCTION

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Yonghui Zhang, Fujian (CN); Xiaojia Liu, Fujian (CN); Donghai Chen, Fujian (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 0 days.

(21) Appl. No.: 15/056,253

(22) Filed: Feb. 29, 2016

(65) Prior Publication Data

US 2017/0043358 A1 Feb. 16, 2017

(30) Foreign Application Priority Data

Aug. 14, 2015 (CN) ...................... 2015 2 0614386 U

(51) Int. Cl.
| | |
|---|---|
| *A62C 31/00* | (2006.01) |
| *B05B 1/16* | (2006.01) |
| *B05B 1/18* | (2006.01) |
| *B05B 1/12* | (2006.01) |
| *F16K 31/524* | (2006.01) |
| *B05B 1/30* | (2006.01) |

(Continued)

(52) U.S. Cl.
CPC .............. *B05B 1/1663* (2013.01); *B05B 1/02* (2013.01); *B05B 1/12* (2013.01); *B05B 1/14* (2013.01); *B05B 1/1627* (2013.01); *B05B 1/1636* (2013.01); *B05B 1/185* (2013.01); *B05B 1/3046* (2013.01); *B05B 15/066* (2013.01); *B05B 15/067* (2013.01); *F16K 31/52483* (2013.01)

(58) Field of Classification Search
CPC B05B 1/1663; B05B 1/12; B05B 1/14; B05B 1/185; B05B 15/066; B05B 15/067; B05B 1/3046; B05B 1/1627; B05B 1/1636; B05B 1/02; F16K 31/52483
USPC ....... 239/552, 548, 443, 446, 556, 558, 583, 239/587.1, 587.4, 601
See application file for complete search history.

(56) References Cited

U.S. PATENT DOCUMENTS 7,740,186 B2 * 6/2010 Macan .................. B05B 1/1654
  239/446
8,348,181 B2 * 1/2013 Whitaker .............. B05B 1/1636
  239/443

(Continued)

*Primary Examiner* — Steven J Ganey
(74) *Attorney, Agent, or Firm* — Rabin & Berdo, P.C.

(57) ABSTRACT

A top spraying shower head with reset function comprises a shower head main body having: a waterway switch valve, an inlet passage, a first outlet hole, and a second outlet hole concentrically arranged in the direction of the inlet passage. The inlet passage with the first outlet hole or the second outlet hole form a first outlet passage and a second outlet passage respectively. The waterway switch valve comprises: a valve body having a slidable valve body that moves between a first position and a second position to close the first outlet passage or the second outlet passage; a sealing element which can open the first and second outlet passage; an elastic element abutting between one end of the valve spindle and the inner wall of the valve body; and a W-shaped camshaft rotatably assembled in the valve body.

18 Claims, 6 Drawing Sheets

(51) Int. Cl.
*B05B 1/02* (2006.01)
*B05B 1/14* (2006.01)
*B05B 15/06* (2006.01)

(56) References Cited

U.S. PATENT DOCUMENTS 8,919,671 B2 * 12/2014 Yu .......................... B05B 1/1627
  239/587.4
2012/0312899 A1 * 12/2012 Miller ....................... B05B 1/18
  239/443

* cited by examiner

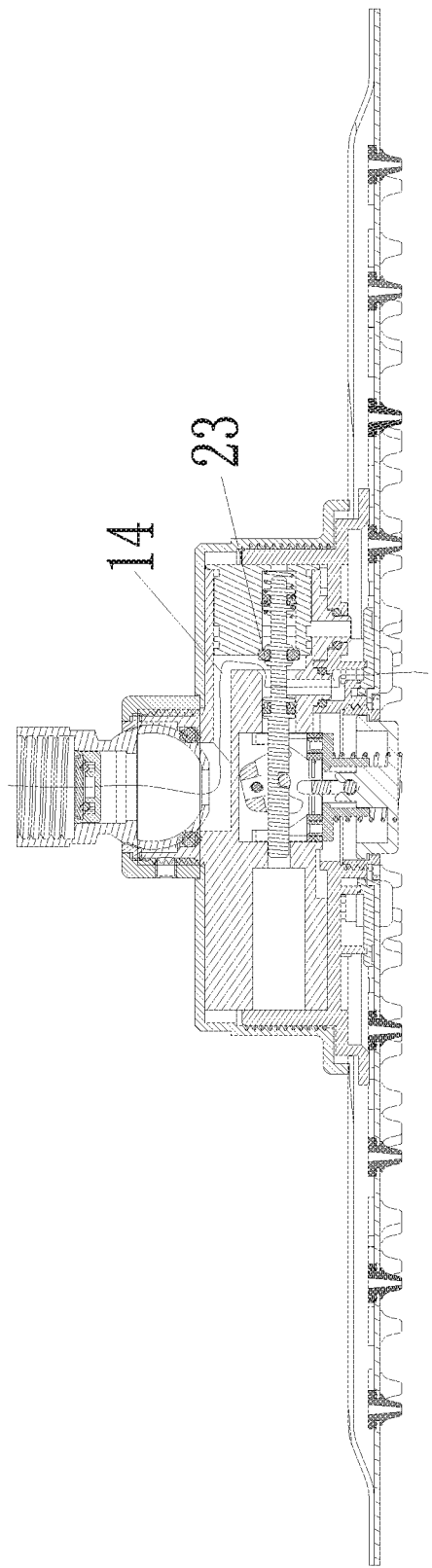

TOP SPRAYING SHOWER HEAD WITH RESET FUNCTION

FIELD OF THE INVENTION

The present invention relates to a top spraying shower head.

BACKGROUND OF THE INVENTION

Top spraying shower heads have larger outlet volume and larger outlet area compared to the traditional hand shower head. And with the improvement of people's life level, single functional shower heads can not meets the needs. Therefore, the top spraying shower heads are added with massage function based on the shower function, people can manually switch to select shower function and massage function. However, traditional top spraying shower heads have not reset function when the water supply is turned off, that is to say, when the user uses the massage function, and after the shower, the shower head is still situated in the massage function. It is also situated in the massage function at the next time, if it is a child, he may not be able to switch the top spraying shower head and can but use the massage function due to the height reason, thus making it inconvenient.

SUMMARY OF THE INVENTION

The present invention is provided with a top spraying shower head with both shower function and massage function to solve above mentioned problem, and the shower head is automatically switched to shower function after the shower.

The technical proposal of the present invention is that: A top spraying shower head with reset function, wherein comprising a shower head main body and a waterway switch valve disposed in the shower head main body;

the shower head main body is disposed with an inlet passage and a first outlet hole, a second outlet hole that are concentrically arranged in the direction of the inlet passage; the inlet passage and the first outlet hole, the second outlet hole form a first outlet passage and a second outlet passage respectively;

the waterway switch valve comprises: a valve spindle slidably assembled in the valve body, the valve spindle is slidable between a first position and a second position so as to close the first outlet passage or the second outlet passage;

a sealing element, when the valve spindle is located in the first position, the sealing element closes the second outlet passage; when the valve spindle is located in the second position, the sealing element closes the first outlet passage;

an elastic element abutting between one end of the valve spindle and the inner wall of the valve body; when the valve spindle is located in the second position, the elastic element is compressed; and a camshaft rotatably assembled in the valve body, one end of the camshaft is W shaped and has two connecting incline surfaces, the two incline surfaces are arranged left and right, the valve spindle is connected to the connecting portion of the two incline surfaces in driving way, the other end of the camshaft is rotatably connected in the valve body.

In another preferred embodiment, the outlet cover plate of the shower head main body is disposed with a button, one end of the button is connected to a pendulum in driving way.

In another preferred embodiment, the end of the pendulum is faced to the two incline surfaces and the pendulum can respectively contact with the two incline surfaces and push the two incline surfaces with the forward and backward movement of the button to drive the other end of the camshaft to rotate so as to drive the valve spindle to slide left or right.

In another preferred embodiment, the button is disposed with a lock block, the shower head main body is disposed with a protruding block coupled to the lock block; when the button is located in the initial position, the lock block abuts against the protruding block and stopped.

In another preferred embodiment, the end of the button is disposed with a reset spring.

In another preferred embodiment, when the valve spindle is located in the second position, the resilience force of the spring is less than the water pressure to the valve spindle; when the water supply is turned off, the valve spindle resets to the first position under the action of the resilience force of the elastic element.

In another preferred embodiment, the waterway switch valve has two sealing elements, when the valve spindle is located in the first position, the second sealing element closes the second outlet passage; when the valve spindle is located in the second position, the first sealing element closes the first outlet passage.

In another preferred embodiment, the waterway switch valve has one sealing element, the sealing element closes the first outlet passage or the second outlet passage with the valve spindle sliding to left or right.

In another preferred embodiment, the valve spindle is disposed with a Y shaped sealing ring at the outer side of the sealing element, the Y shaped sealing ring is always contacted with the inner wall of the waterway switch valve; when the valve spindle is located in the first position or the second position, the total force of the water pressure on the Y shaped sealing ring and the elastic force of the elastic element is slightly less than the water pressure on the sealing element.

In another preferred embodiment, the first outlet passage outflows shower water, the second outlet passage outflows massage water.

Compared to the existing technology, the technical proposal of the present invention has advantages as follows:

1. when the water supply is turned on, pressing the button can drive the valve spindle to slide so as to drive the sealing element to close the first outlet passage and under the action of the water pressure, it keeps in sealing state, when the water supply is turned off, the sealing element resets under the action of the elastic element, and the sealing element closes the second outlet passage to achieve automatic resetting effect. The top spraying shower head just needs one button to achieve that effect, it has simple structure, convenient usage, new design and low cost.

2. the valve spindle is driven to slide by the transmission of the pendulum and the camshaft, so that it is convenient to switch and has a good effect.

3. the camshaft has two connecting incline surfaces, the valve spindle is connected to the connecting portion of the two incline surfaces in driving way, the end of the pendulum is coupled to the two incline surfaces so that the camshaft rotates to drive the valve spindle to slide up and down, it has new design, compact structure and small appearance.

4. two ends of the valve spindle are respectively disposed with a Y shaped sealing ring, the sealing ring is always contacted with the inner wall of the valve body of the waterway switch valve, so that the valve spindle slides more smoothly, and it has good operation hand feel.

BRIEF DESCRIPTION OF THE DRAWINGS

FIG. 6 illustrates a sectional view of the top spraying shower head of the second embodiment of the present invention when the shower head outflows massage water.

DETAILED DESCRIPTION OF THE EMBODIMENTS

Figure 1:
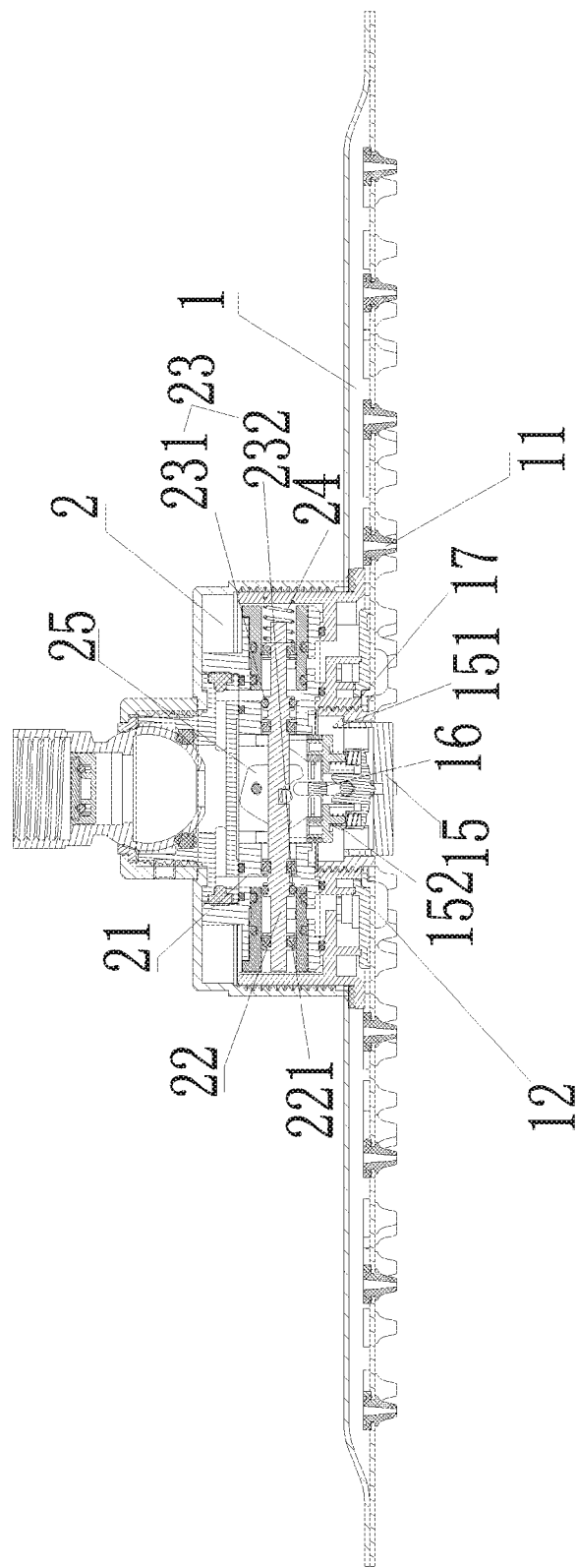
FIG. 1 illustrates a sectional view of the top spraying shower head of a first embodiment of the present invention.
Figure 2:
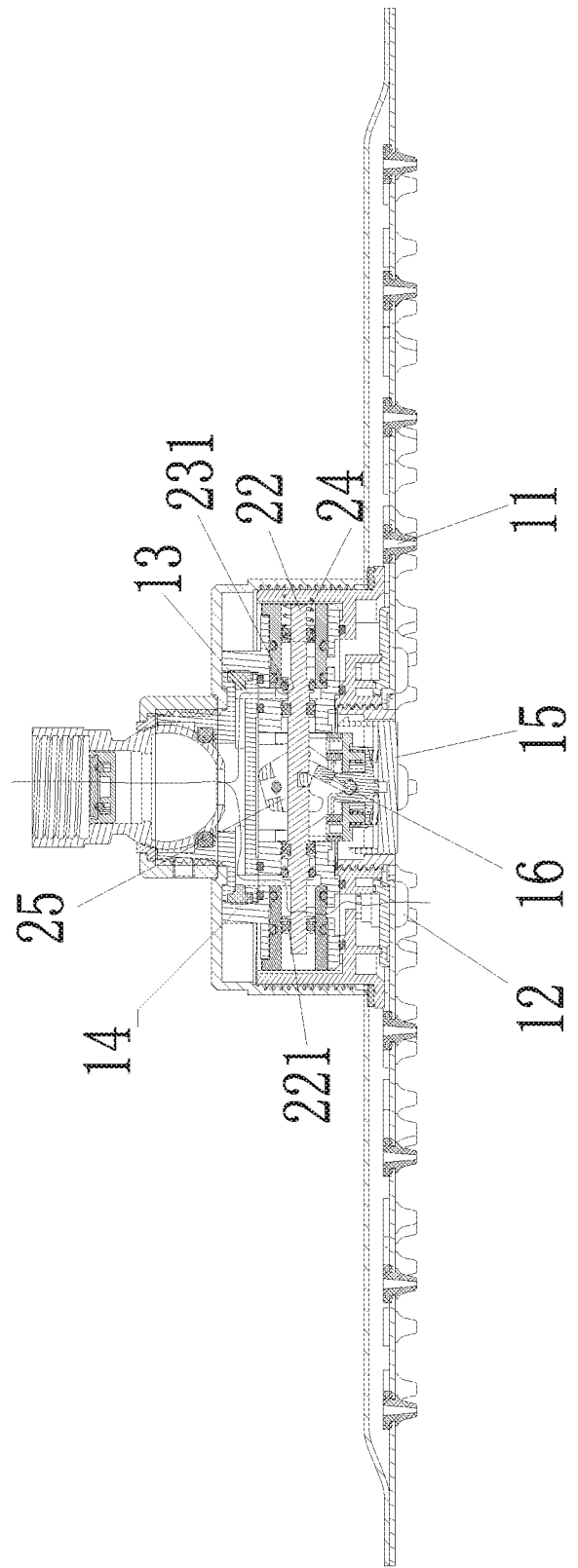
FIG. 2 illustrates a sectional view of the top spraying shower head of the first embodiment of the present invention when the shower head outflows massage water.
Figure 3:
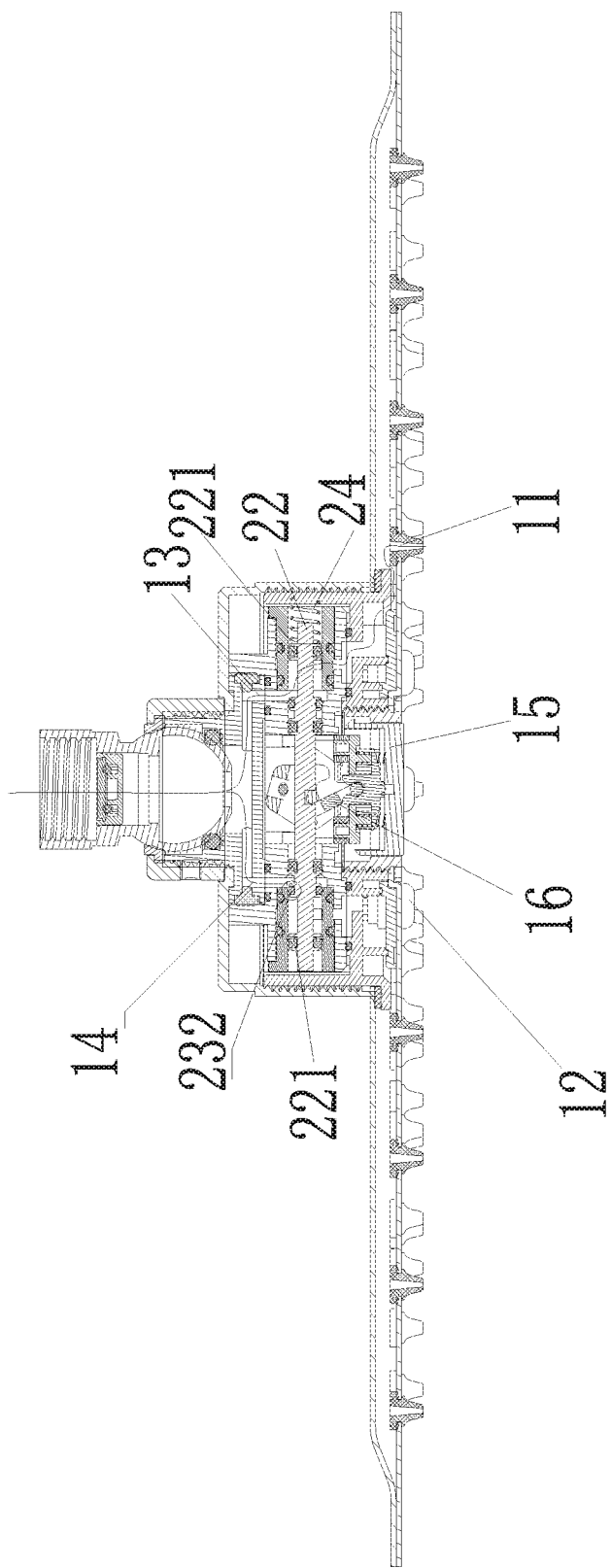
FIG. 3 illustrates a sectional view of the top spraying shower head of the first embodiment of the present invention when the shower head outflows shower water.
Figure 4:
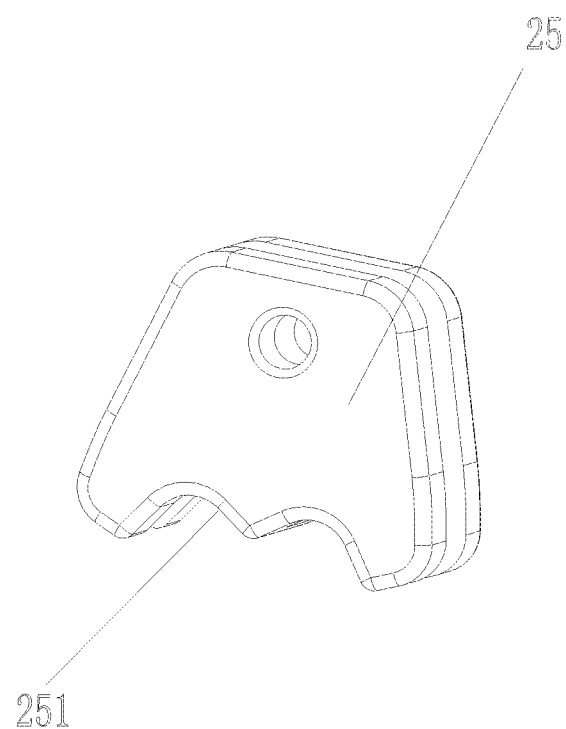
FIG. 4 illustrates a schematic diagram of the camshaft of the first embodiment of the present invention.

The present invention will be further described with the drawings and the embodiments.

The First Embodiment

Referring to FIGS. 1~4, the top spraying shower head with reset function comprises a shower head main body 1 and a waterway switch valve 2 disposed in the shower head main body 1;

the shower head main body 1 is disposed with an inlet passage and a first outlet hole 11, a second outlet hole 12 that are concentrically arranged in the direction of the inlet passage; the inlet passage and the first outlet hole 11, the second outlet hole 12 form a first outlet passage 13 and a second outlet passage 14 respectively;

the waterway switch valve 2 comprises: a valve spindle 22 slidably assembled in the valve body 21, the valve spindle 22 is slidable between a first position and a second position so as to close the first outlet passage 13 or the second outlet passage 14;

a sealing element 23, when the valve spindle 22 is located in the first position, the sealing element 23 closes the second outlet passage 14; when the valve spindle 22 is located in the second position, the sealing element 23 closes the first outlet passage 13;

an elastic element 24 abutting between one end of the valve spindle 22 and the inner wall of the valve body 21; when the valve spindle 22 is located in the second position, the elastic element is compressed 24; and a camshaft 25 rotatably assembled in the valve body 21, one end of the camshaft 25 is W shaped and has two connecting incline surfaces 251, the two incline surfaces 251 are arranged left and right, the valve spindle 22 is connected to the connecting portion of the two incline surfaces 251 in driving way, the other end of the camshaft 25 is rotatably connected in the valve body 21.

The outlet cover plate of the shower head main body 1 is disposed with a button 15, one end of the button 15 is connected to a pendulum 16 in driving way.

The end of the pendulum 16 is faced to the two incline surfaces 251 and the pendulum 16 can respectively contact with the two incline surfaces 251 and push the two incline surfaces 251 with the forward and backward movement of the button 15 to drive the other end of the camshaft 25 to rotate so as to drive the valve spindle 22 to slide left or right.

When the valve spindle 22 is located in the second position, the resilience force of the spring 24 is less than the water pressure to the valve spindle 22.

The valve spindle 22 is disposed with a Y shaped sealing ring 221 at the outer side of the sealing element 23, the Y shaped sealing ring 221 is always contacted with the inner wall of the waterway switch valve 2; when the valve spindle 22 is located in the first position or the second position, the total force of the water pressure on the Y shaped sealing ring 221 and the elastic force of the elastic element 24 is slightly less than the water pressure on the sealing element 23.

The first outlet passage 13 outflows shower water, the second outlet passage 14 outflows massage water.

When the water supply is turned, the button 15 is situated in the initial position, the valve spindle 22 is located in the first position, the first outlet passage 13 is open, while the second outlet passage 14 is closed, at this time, the shower head outflows shower water. When the user needs to use the massage function, he can press the button 15, with the pendulum 16 abutting against the camshaft 25, the camshaft 25 is driven to drive the valve spindle 22 to slide. So that the valve spindle 22 is switched to the second position, the shower head outflows massage water. As the valve spindle 22 is located in the second position, the resilience force of the elastic element 24 is less than the water pressure on the valve spindle 22. Therefore, the valve spindle is kept in the second position, it ensures the stable of the outlet state. At the same way, when the top spraying shower head is situated in the massage function, pressing the button 15 can switch to shower function.

When the water supply is turned off, no water pressure exists, the valve spindle 22 resets to close the second outlet passage 14 under the action of the elastic element 24, so that the top spraying shower is automatically reset to shower function. The top spraying shower head just needs one button to achieve automatic resetting effect, it has simple structure, convenient usage, and it is a new design and low cost.

As the sealing element 23 suffers water pressure on the water-flow side and the water-stop side, the Y shaped sealing ring 221 just suffers water pressure on the water-flow side, so that a proper and suitable elastic element 24 can make that the water pressure on the sealing element 23 is slightly larger than the total force of the water pressure on the Y shaped sealing ring 221 and the elastic force of the elastic element 24. The user can just press the button lightly to drive the spindle 22 to move, it is not only water saving, but also of good hand feel.

The present invention has the configuration: the button 15 is disposed with a lock block 151, the shower head main body 1 is disposed with a protruding block 17 coupled to the lock block 151; when the button 15 is located in the initial position, the lock block 151 abuts against the protruding block 17 and stopped, so that the button 15 can reset accurately to the initial position and would not separate from the cover plate.

The end of the button 15 is disposed with a reset spring 152. So that the button can automatically reset under the action of the reset spring 152 after pressed.

There are two sealing elements 23, when the valve spindle 22 is located in the first position, the second sealing element 23 closes the second outlet passage; when the valve spindle is located in the second position, the first sealing element 23 closes the first outlet passage.

Two ends of the valve spindle 22 are respectively disposed with a Y shaped sealing ring 221, the Y shaped sealing rings 221 are always contacted with the inner wall of the valve body of the waterway switch valve, so that valve spindle slides more smoothly that making it with well operating hand feel.

The Second Embodiment

Figure 5:
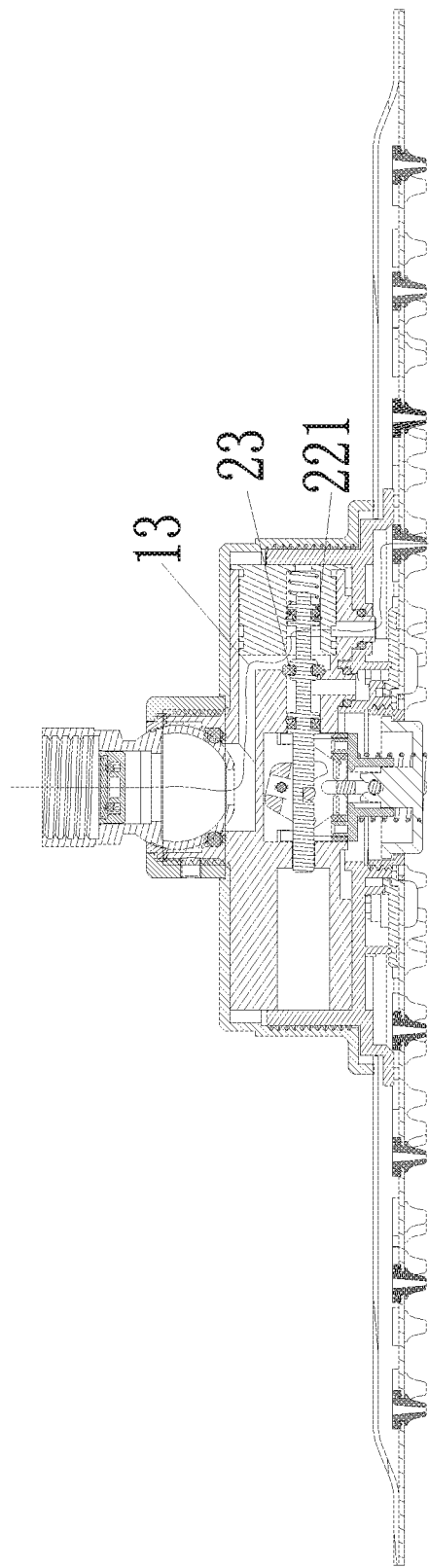
FIG. 5 illustrates a sectional view of the top spraying shower head of a second embodiment of the present invention when the shower head outflows shower water.

Referring to FIG. 5 and FIG. 6, this embodiment differs from the first embodiment in that: the waterway switch valve has one sealing element 23, the sealing element 23 closes the first outlet passage 13 or the second outlet passage 14 with the valve spindle 22 sliding to left or right. The rest portion of this embodiment is similar to the first embodiment that it would not be further described hereafter.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A top spraying shower head with reset function, wherein comprising a shower head main body and a waterway switch valve disposed in the shower head main body;
   the shower head main body is disposed with an inlet passage and a first outlet hole, a second outlet hole that are concentrically arranged in the direction of the inlet passage; the inlet passage and the first outlet hole, the second outlet hole form a first outlet passage and a second outlet passage respectively;
   the waterway switch valve comprises: a valve spindle slidably assembled in a valve body, the valve spindle is slidable between a first position and a second position so as to close the first outlet passage or the second outlet passage;
   a sealing element, when the valve spindle is located in the first position, the sealing element closes the second outlet passage; when the valve spindle is located in the second position, the sealing element closes the first outlet passage;
   an elastic element abutting between one end of the valve spindle and an inner wall of the valve body; when the valve spindle is located in the second position, the elastic element is compressed; and
   a camshaft rotatably assembled in the valve body, one end of the camshaft is W shaped and has two connecting incline surfaces, the two incline surfaces are arranged left and right, the valve spindle is connected to a connecting portion of the two incline surfaces in driving way, the other end of the camshaft is rotatably connected in the valve body.

2. The top spraying shower head with reset function according to claim 1, wherein the outlet cover plate of the shower head main body is disposed with a button, one end of the button is connected to a pendulum in driving way.

3. The top spraying shower head with reset function according to claim 2, wherein the end of the pendulum is faced to the two incline surfaces and the pendulum can respectively contact with the two incline surfaces and push the two incline surfaces with the forward and backward movement of the button to drive the other end of the camshaft to rotate so as to drive the valve spindle to slide left or right.

4. The top spraying shower head with reset function according to claim 3, wherein the first outlet passage outflows shower water, the second outlet passage outflows massage water.

5. The top spraying shower head with reset function according to claim 2, wherein the button is disposed with a lock block, the shower head main body is disposed with a protruding block coupled to the lock block; when the button is located in the initial position, the lock block abuts against the protruding block and stopped.

6. The top spraying shower head with reset function according to claim 5, wherein the end of the button is disposed with a reset spring.

7. The top spraying shower head with reset function according to claim 6, wherein the first outlet passage outflows shower water, the second outlet passage outflows massage water.

8. The top spraying shower head with reset function according to claim 2, wherein the first outlet passage outflows shower water, the second outlet passage outflows massage water.

9. The top spraying shower head with reset function according to claim 5, wherein the first outlet passage outflows shower water, the second outlet passage outflows massage water.

10. The top spraying shower head with reset function according to claim 1, wherein when the valve spindle is located in the second position, the resilience force of the spring is less than the water pressure to the valve spindle; when the water supply is turned off, the valve spindle resets to the first position under the action of the resilience force of the elastic element.

11. The top spraying shower head with reset function according to claim 10, wherein the first outlet passage outflows shower water, the second outlet passage outflows massage water.

12. The top spraying shower head with reset function according to claim 1, wherein the waterway switch valve has two sealing elements, when the valve spindle is located in the first position, the second sealing element closes the second outlet passage; when the valve spindle is located in the second position, the first sealing element closes the first outlet passage.

13. The top spraying shower head with reset function according to claim 12, wherein the first outlet passage outflows shower water, the second outlet passage outflows massage water.

14. The top spraying shower head with reset function according to claim 1, wherein the waterway switch valve has one sealing element, the sealing element closes the first outlet passage or the second outlet passage with the valve spindle sliding to left or right.

15. The top spraying shower head with reset function according to claim 14, wherein the first outlet passage outflows shower water, the second outlet passage outflows massage water.

16. The top spraying shower head with reset function according to claim 1, wherein the valve spindle is disposed with a Y shaped sealing ring at the outer side of the sealing element, the Y shaped sealing ring is always contacted with the inner wall of the waterway switch valve; when the valve spindle is located in the first position or the second position, the total force of the water pressure on the Y shaped sealing ring and the elastic force of the elastic element is slightly less than the water pressure on the sealing element.

17. The top spraying shower head with reset function according to claim 16, wherein the first outlet passage outflows shower water, the second outlet passage outflows massage water.

18. The top spraying shower head with reset function according to claim 1, wherein the first outlet passage outflows shower water, the second outlet passage outflows massage water.

* * * * *